(12) United States Patent
Maresh et al.

(10) Patent No.: US 10,248,784 B2
(45) Date of Patent: Apr. 2, 2019

(54) SEQUENTIAL OBJECT SET PASSWORDS

(71) Applicant: INTERNATIONAL BUSINESS MACHINES CORPORATION, Armonk, NY (US)

(72) Inventors: Mark E. Maresh, Wake Forest, NC (US); Colm Nolan, Meath (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/366,203

(22) Filed: Dec. 1, 2016

(65) Prior Publication Data

US 2018/0157823 A1    Jun. 7, 2018

(51) Int. Cl.
*H04L 29/06* (2006.01)
*G06F 21/45* (2013.01)

(52) U.S. Cl.
CPC .............. *G06F 21/45* (2013.01); *H04L 63/08* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,347,103 B2 | 1/2013 | Jones et al. | |
| 8,826,406 B2 | 9/2014 | Ahn et al. | |
| 8,943,563 B1 | 1/2015 | Orlovskaya | |
| 9,239,919 B2 | 1/2016 | Hagiwara | |
| 2004/0230843 A1 | 11/2004 | Jansen | |
| 2007/0261109 A1* | 11/2007 | Renaud | G06F 21/31 726/6 |
| 2009/0077653 A1* | 3/2009 | Osborn | G06F 21/36 726/17 |
| 2011/0023112 A1* | 1/2011 | Murai | G06F 21/36 726/17 |
| 2011/0162066 A1* | 6/2011 | Kim | G06F 3/017 726/18 |
| 2011/0320813 A1* | 12/2011 | Suginaka | H04L 9/32 713/168 |
| 2011/0321125 A1* | 12/2011 | Kyohgoku | G06F 21/00 726/2 |

(Continued)

OTHER PUBLICATIONS

List of IBM Patents or Patent Applciations Treated as Related; Date Filed: Dec. 1, 2016, pp. 1-2.

(Continued)

*Primary Examiner* — Shin-Hon (Eric) Chen
(74) *Attorney, Agent, or Firm* — Cantor Colburn LLP; Tihon Poltavets

(57) ABSTRACT

Examples of techniques for sequential object set passwords are disclosed. In one example implementation according to aspects of the present disclosure, a computer-implemented method may include receiving, at a user device, a first object set; transmitting, to a processing device, a first rearranged object set that represents the first object set rearranged into a first sequential order by the user; and responsive to the first rearranged object set matching a first known sequential object set, receiving, at the user device, a second object set.

3 Claims, 12 Drawing Sheets

(56) References Cited

U.S. PATENT DOCUMENTS

| | | | |
|---|---|---|---|
| 2012/0230555 A1* | 9/2012 | Miura | G06K 9/00087 |
| | | | 382/124 |
| 2012/0300985 A1 | 11/2012 | Ito | |
| 2013/0061298 A1* | 3/2013 | Longobardi | G06F 21/42 |
| | | | 726/6 |
| 2013/0139248 A1* | 5/2013 | Rhee | G06F 3/0346 |
| | | | 726/19 |
| 2014/0090035 A1* | 3/2014 | Kodama | G06F 21/31 |
| | | | 726/6 |
| 2015/0235018 A1* | 8/2015 | Gupta | G06F 21/36 |
| | | | 726/19 |
| 2015/0349966 A1* | 12/2015 | Dimitrakos | H04L 9/3271 |
| | | | 713/168 |
| 2016/0148012 A1* | 5/2016 | Khitrov | G06F 21/32 |
| | | | 726/19 |
| 2016/0261586 A1* | 9/2016 | Huang | G06T 11/60 |

OTHER PUBLICATIONS

Mark E. Maresh, et al.,"Sequential Object Set Passwords", U.S. Appl. No. 15/366,187, filed Dec. 1, 2016.

Margaret Rouse,"Graphical password or graphical user authentication (GUA)" Techtarget, SearchSecurity, Jun. 2007, p. 1-4.

* cited by examiner

SEQUENTIAL OBJECT SET PASSWORDS

BACKGROUND

The present disclosure generally relates to data processing systems and, more particularly, relates to sequential object set passwords.

Traditional data processing systems utilize various authentication techniques to control access to resources (i.e., the data processing systems, their data, their applications, and the like). For example, a user may choose a password that is later applied when the user requests access to a secure resource. A password is typically an easy to remember string of letters, numbers, and/or symbols. However, these easy to remember passwords can be compromised by automated password guessing programs. More secure passwords (i.e., longer passwords, random passwords, etc.) can be harder to guess but also easily forgotten by the user.

SUMMARY

According to examples of the present disclosure, techniques including methods, systems, and/or computer program products for sequential object set passwords are provided. An example method may include presenting, by a processing device, an object set to a user, wherein the object set comprises a plurality of objects in a first order. The method may further include receiving, by the processing device, a rearranged object set, wherein the rearranged object set comprises the plurality of objects in a second order. The method may further include comparing the rearranged object set to a known sequential object set stored in a data store. The method may further include responsive to determining that the rearranged object set matches a known sequential object set, enabling the user to access a restricted resource.

Another example method may include receiving, at a user device, a first object set. The method may further include transmitting, to a processing device, a first rearranged object set that represents the first object set rearranged into a first sequential order by the user. The method may further include responsive to the first rearranged object set matching a first known sequential object set, receiving, at the user device, a second object set.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
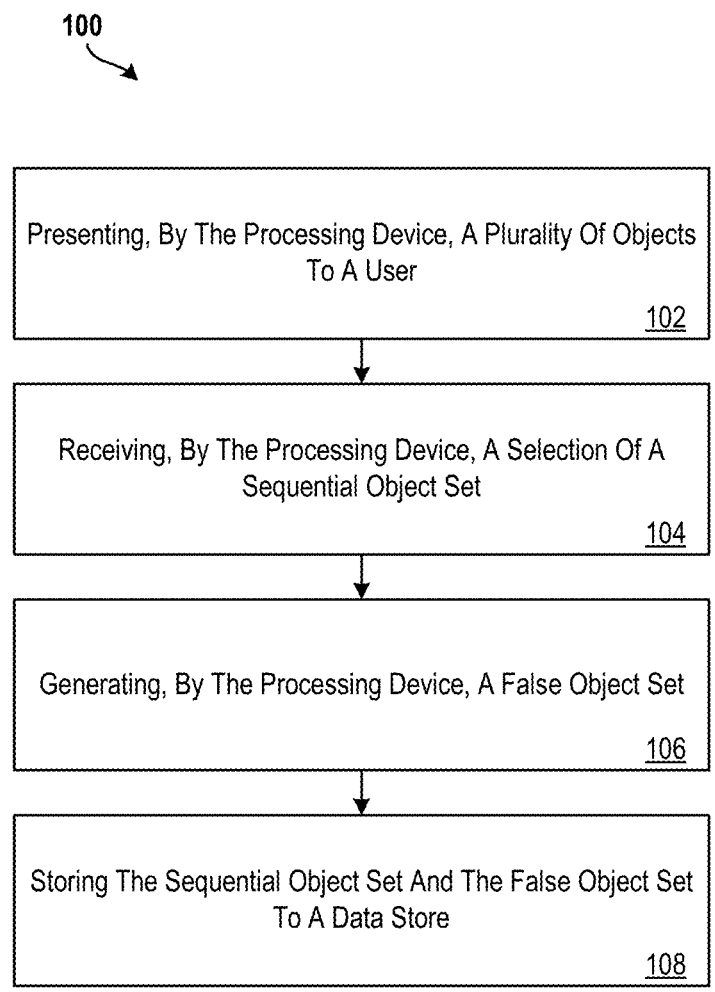
FIG. 1 illustrates a flow diagram of a method 100 for generating a sequential object set and a false object set according to examples of the present disclosure.

Letters, numbers, and/or characters, which are normally used for passwords, are difficult to remember and can be comprised by automated password guessing programs. Also, users tend to use passwords that are easy to remember, like common words (e.g. PASSWD!) and sequences on a keyboard (e.g. ASDFG!), which are easy to guess.

Various implementations are described below by referring to several examples of sequential object set passwords. Sequential object set passwords enable a user to select an easy to remember sequence of images from a larger group of images to use as a password for authentication purposes. For example, a user may select four sequential objects (e.g., pictures, symbols, letters, images, etc.) to act as a password. When the user is presented with the correct four objects, and the user successfully rearranges the four objects into the correct order, authentication occurs. A user may set multiple sequences for multi-step authentication (e.g., multiple sequential object sets must be correctly identified and arranged to achieve authentication).

The present techniques also enable the use of false object sets. False object sets are sets of objects that differ from the sequential object sets. For example, a false object set may include one or more objects that are different from objects in the sequential object sets. This enables additional security by requiring the user to distinguish between sequential object sets and false object sets.

The sequential object sets (which can be user defined, system defined, or both) are intermixed with false object sets and are presented in random order. This requires that the user correctly identify a sequential object set (as opposed to a false object set) and then correctly arrange the objects of the sequential object set into the correct sequential order. Once this occurs, a user is authenticated.

In one example embodiment, an object password system enables a user to select multiple objects in a sequence set to authenticate an account. Once a profile is set up and the user has selected its sequence of objects per set, the objects are displayed one set at a time in a random pattern, including system defined false object sets. To authenticate, the user moves objects in the set into the proper sequence one set at a time. After all the sets of objects are sequenced, authentication is completed.

Sequences of objects are easier to remember than numbers, letter, and/or characters. Moreover, sequences of objects are easier to remember if the number of objects is broken into subsets. False object sets increase the number of possible combinations and provide additional security. These and other advantages will be apparent from the description that follows.

Example embodiments of the disclosure include or yield various technical features, technical effects, and/or improvements to technology. Example embodiments of the disclosure provide increased security for processing systems by using object sets to restrict user access to restricted resources. For example, object sets are presented to a user, and the user must correctly reorder the object sets into a predetermined sequence and/or the user must correctly identify false object sets in order to access a restricted resource. These aspects of the disclosure constitute technical features that yield the technical effect of improving authentication for a processing system. As a result of these technical features and technical effects, a processing using the disclosed techniques of the example embodiments of the disclosure represents an improvement to existing authentication techniques. It should be appreciated that the above examples of technical features, technical effects, and improvements to technology of example embodiments of the disclosure are merely illustrative and not exhaustive.

FIG. 1 illustrates a flow diagram of a method 100 for generating a sequential object set and a false object set according to examples of the present disclosure. The method 100 may be performed, for example, by the processing system 20 of FIG. 5. The example method 100 is described below with reference to FIGS. 3A-3F but is not so limited.

At block 102, the method 100 includes presenting, by the processing device, a plurality of objects to a user. For example, a user sets up an account and chooses from a variety of objects, such as images, pictures, symbols, numbers, letters, etc. that the user wants to designate as a password. For example, the user may select the images illustrated in FIG. 3A as the objects 300a to be used to create sequential object sets. The objects 300a include objects 302, 304, 306, 308, 310, 312, 314. The objects 300a selected by the user may be selected from a larger group of objects (not shown).

Figure 3A:
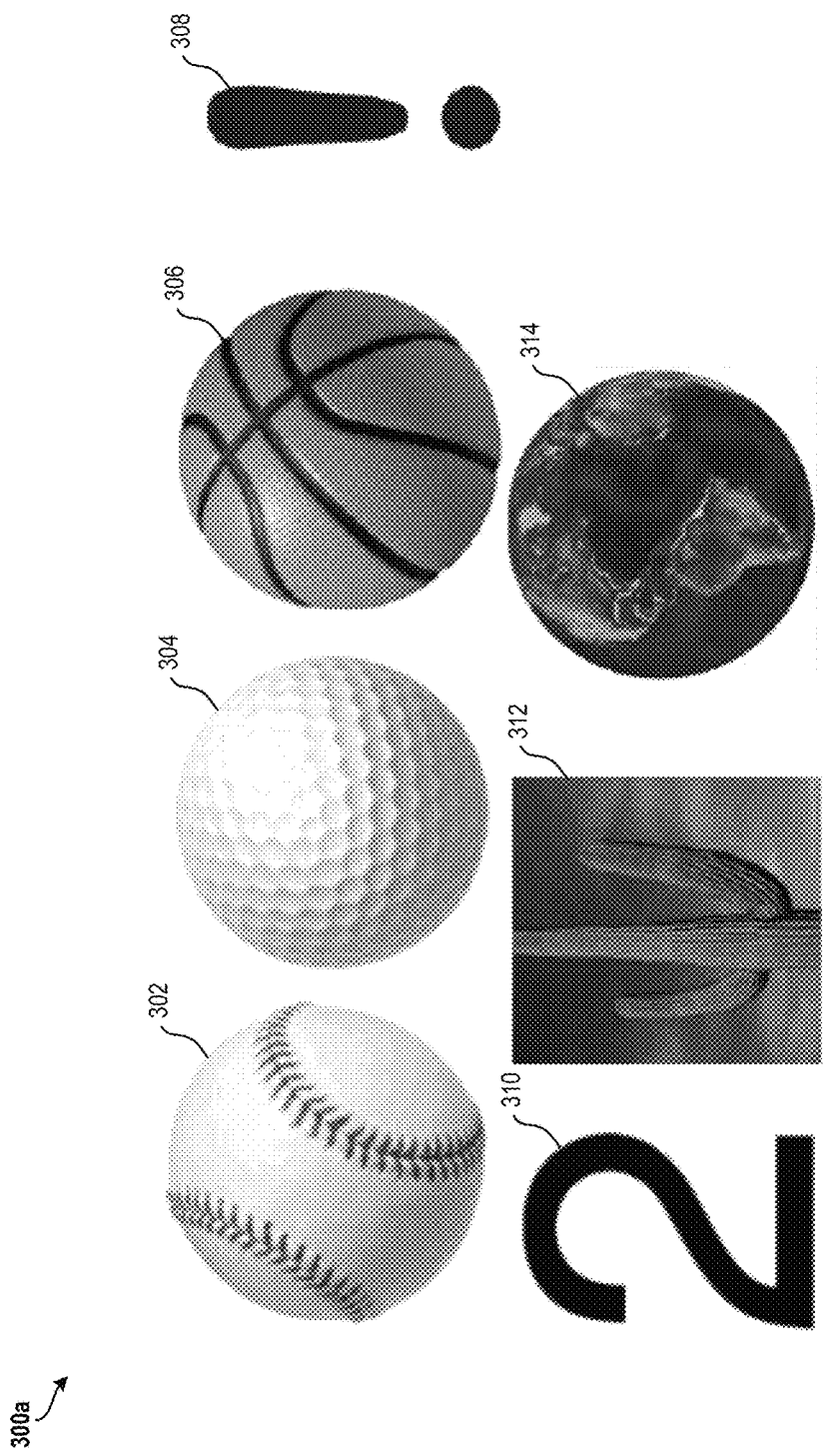
FIG. 3A illustrates a collection of objects that a user uses to define object sets according to examples of the present disclosure.
Figure 3B:
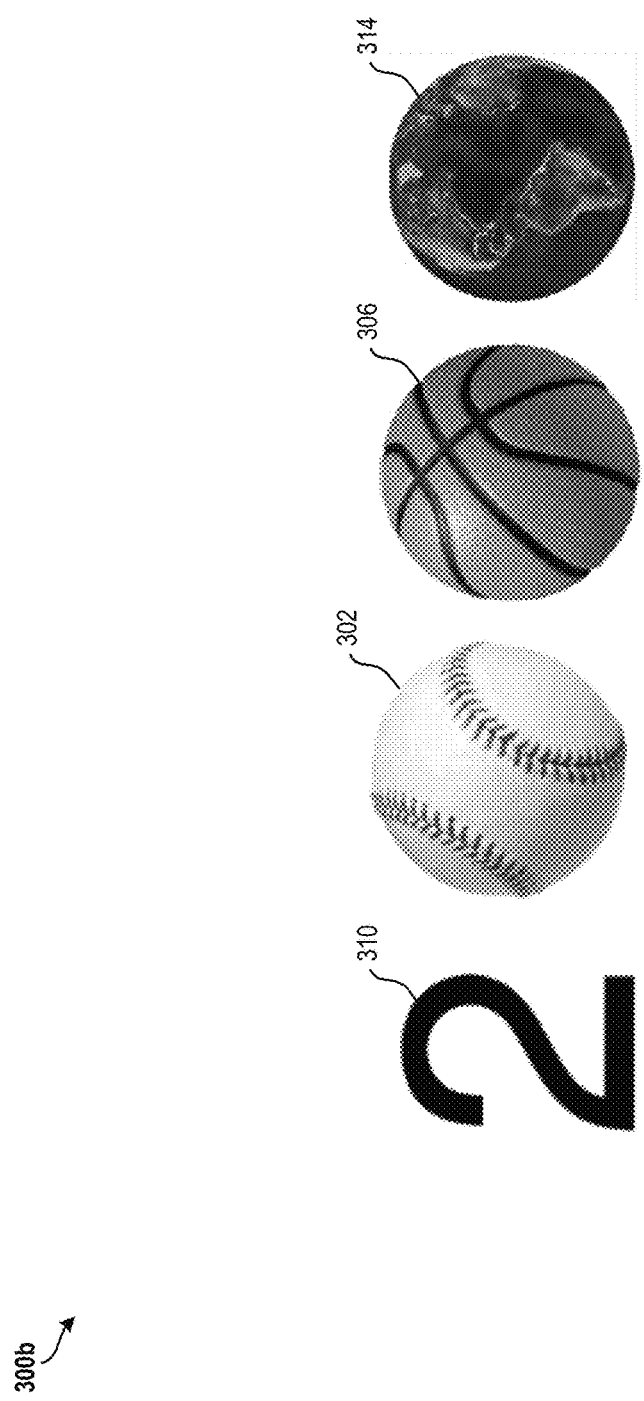
FIGS. 3B, 3C, 3D, 3E, and 3F illustrate various object sets according to examples of the present disclosure.
Figure 3C:
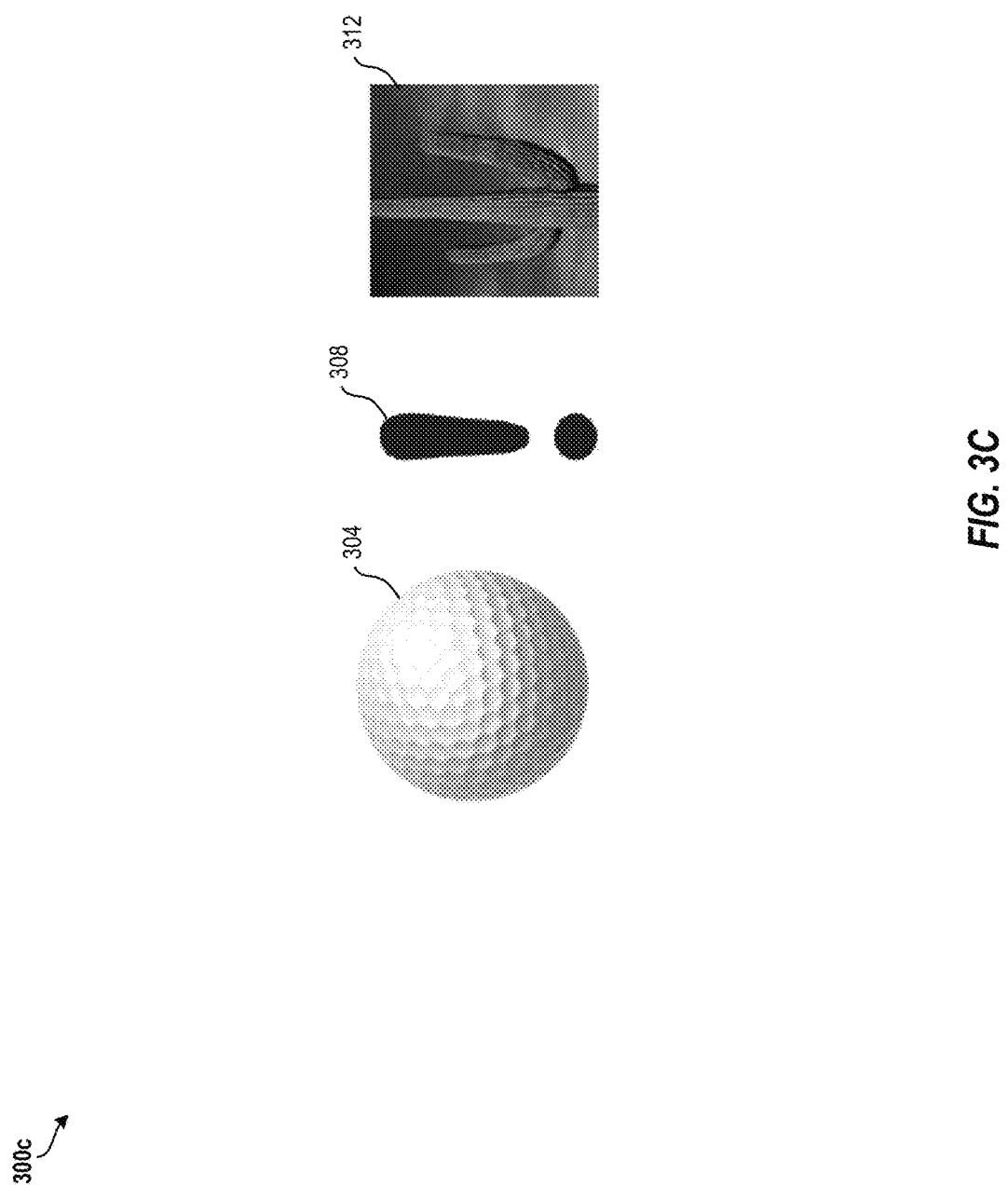
Figure 3D:
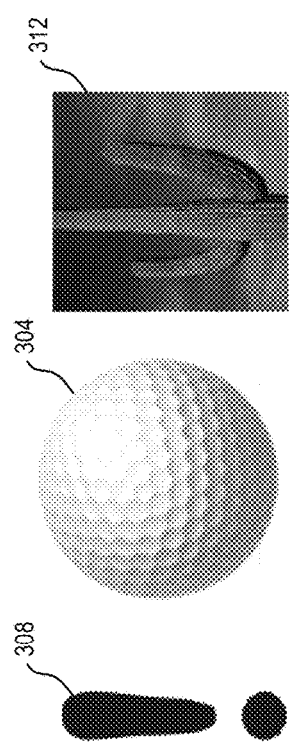

At block 104, the method 100 includes receiving, by the processing device, a selection of a sequential object set. The sequential object set is a first subset of the plurality of objects presented to the user. That is, the user decides how he wants to sequence the objects (i.e., in what order the objects appear). In the example of FIG. 3B, the user designates the objects 310, 302, 306, and 314 in the order shown as a sequential object set 300b.

In some examples, the user may select a second sequential object set. For example, in FIG. 3C, the user designates the objects 304, 308, and 312 in the order shown as a second sequential object set 300c.

At block 106, the method 100 includes generating, by the processing device, a false object set. The false object set is a second subset of the plurality of objects presented to the user. The false object set (e.g., the false object set 3E of FIG. 3E) and the sequential object set differ by at least one object. In examples, the false object set and the sequential object set each contain unique objects such that no commonality of objects exist between object sets and false object sets.

At block 108, the method 100 includes storing the sequential object set and the false object set to a data store. The sequential object set is stored that it can be used later for authorization, which is described in the example of FIG. 2.

Additional processes also may be included, and it should be understood that the processes depicted in FIG. 1 represent illustrations, and that other processes may be added or existing processes may be removed, modified, or rearranged without departing from the scope and spirit of the present disclosure.

Figure 2:
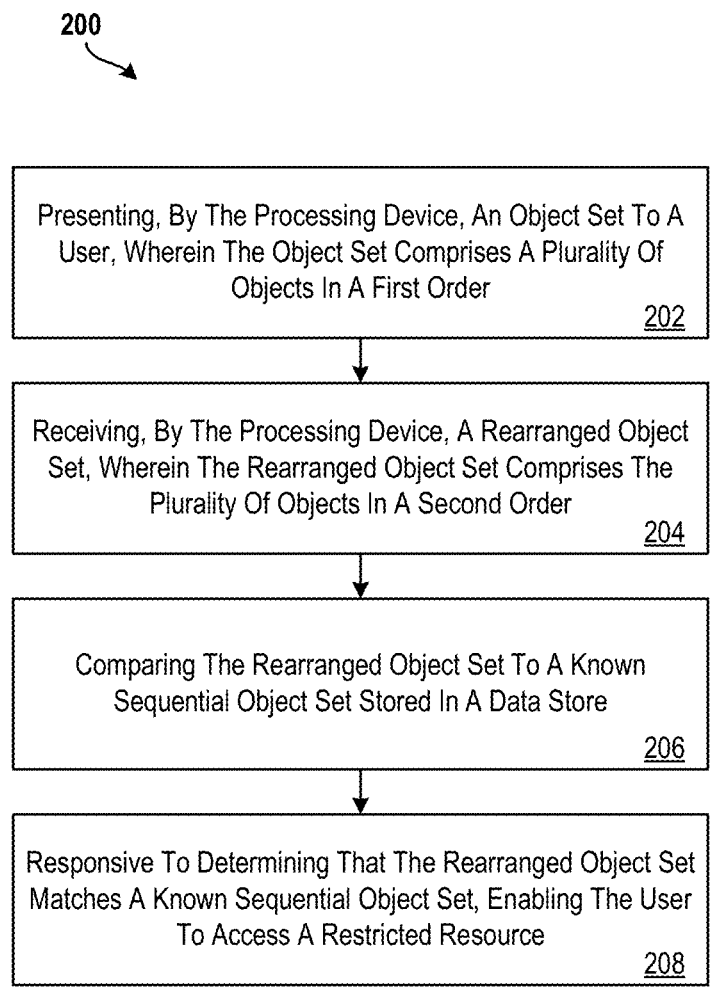
FIG. 2 illustrates a flow diagram of a method 200 for applying a sequential object set and a false sequential object set during authentication according to examples of the present disclosure.

FIG. 2 illustrates a flow diagram of a method 200 for applying a sequential object set and a false sequential object set during authentication according to examples of the present disclosure. The method 200 may be performed, for example, by the processing system 20 of FIG. 5. The example method 200 is described below with reference to FIGS. 3A-3F but is not so limited.

At block 202, the method 200 includes presenting, by the processing device, an object set to a user, wherein the object set comprises a plurality of objects in a first order. For example, in FIG. 3D, an object set 300d is presented. The object set 300d includes the objects of the second sequential object set 300c of FIG. 3C. However, the objects are in a different order than the second sequential object set 300c.

At block 204, the method 200 includes receiving, by the processing device, a rearranged object set, wherein the rearranged object set comprises the plurality of objects in a second order The user would swap object 304 and object 308 (e.g., using drop and drag, clicking the objects in order, etc.) to rearrange the object set 300d to match the second sequential object set 300c. Since the objects 308, 304, 312 are now in sequence, the user may select to advance (e.g., click "SUBMIT") to authenticate (or to receive additional object sets if additional levels of authentication is implemented by clicking "NEXT").

At block 206, the method 200 includes comparing the rearranged object set to a known sequential object set stored in a data store.

At block 208, the method 200 includes responsive to determining that the rearranged object set matches a known sequential object set, enabling the user to access a restricted resource. If, however, it is determined that the rearranged object set does not match the known sequential object set, the method 200 includes denying the user access to the restricted resource. The restricted resource may be a webpage or website, an application or portion of an application, data, or any other suitable resource that may be restricted.

Figure 3E:
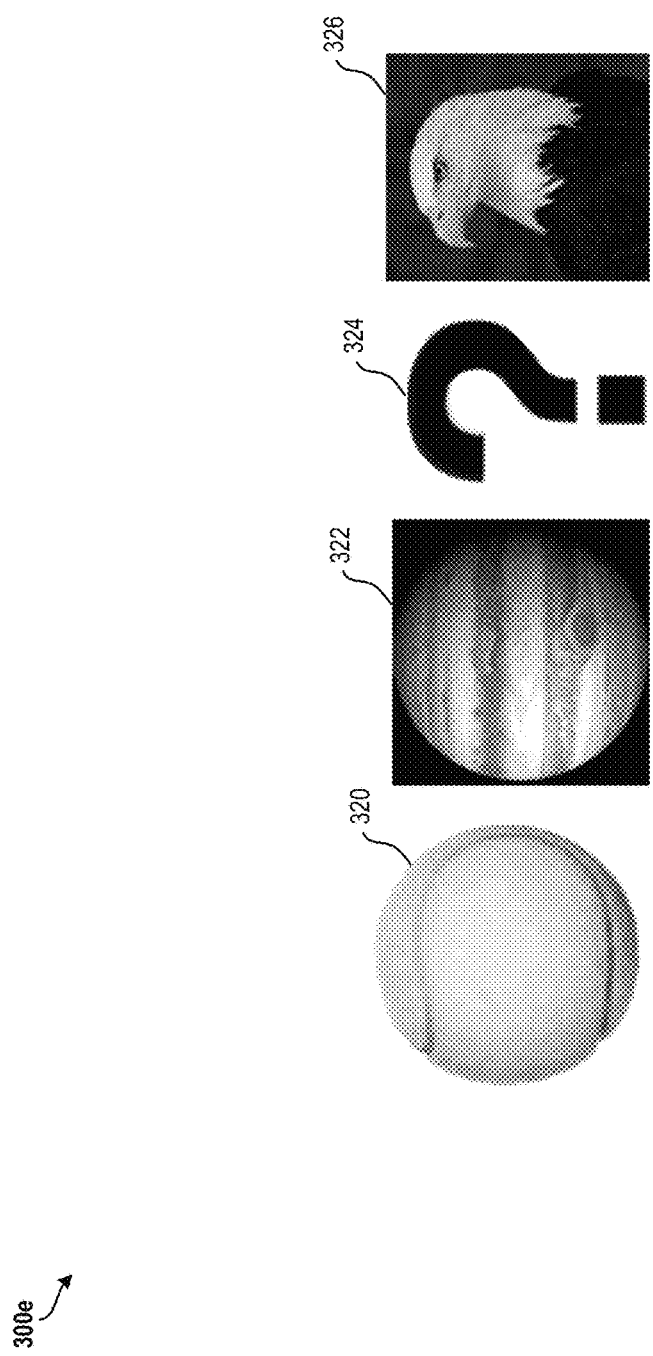

Additional processes also may be included. For example, the method 200 may include presenting a false object set to a user. In particular, FIG. 3E illustrates a false object set 300e that includes objects 320, 322, 324, 326. If the user recognizes the false object set 300e as a false object set, the user may indicate such by selecting a "FALSE OBJECT SET" or "SKIP" button. If the user attempts to rearrange the false object set, it may be assumed that the user is an unauthorized and access to the restricted resource may be denied, additional authorization measures may be implemented (e.g., additional object sets presented, a prompt to enter a password, etc.), and the like. In some examples, the false object sets are automatically generated, while in other examples the false object sets are manually generated by a user. In the case of manually generated false object sets, a user may be more easily able to identify false object sets.

Figure 3F:
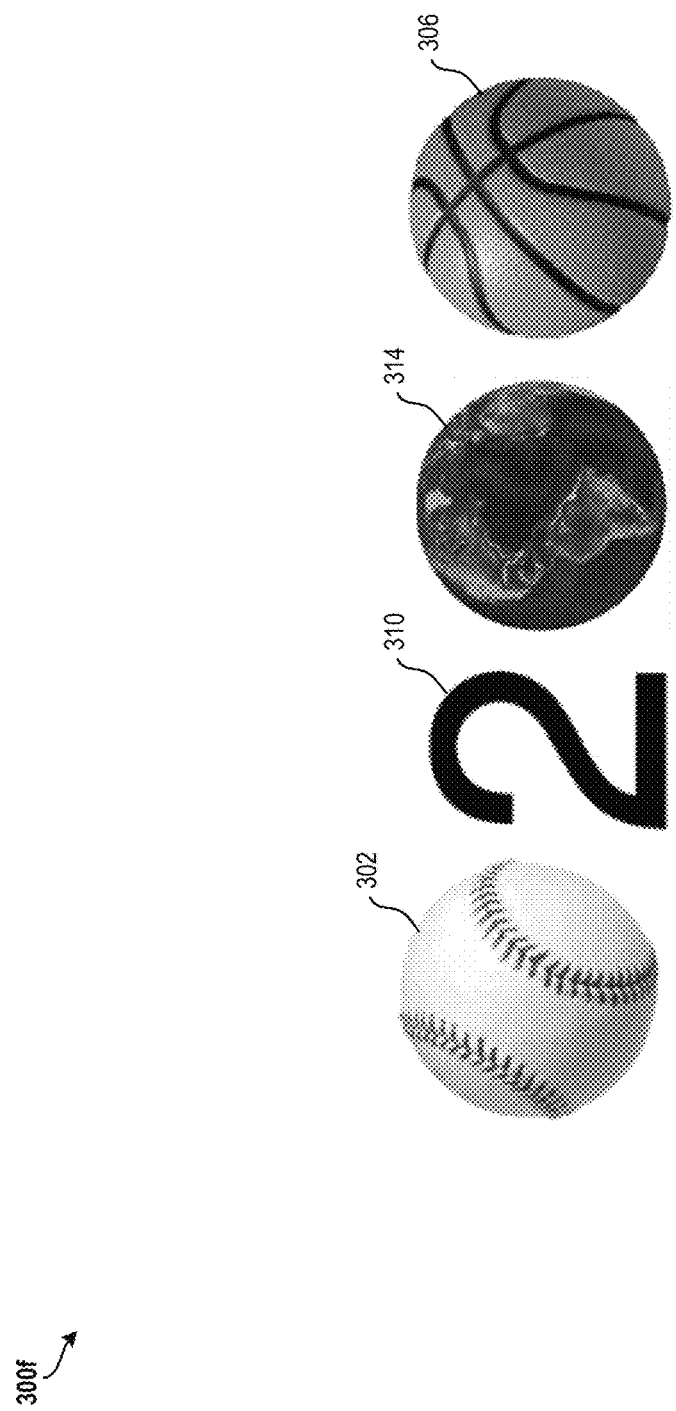

If the user successfully rearranges the first object set 300d and/or successfully recognizes the false object set 300e as such, the user may be presented with an additional object set 300f as illustrated in FIG. 3F. The additional object set 300f includes the same objects as the second sequential object set 300b of FIG. 3B but in a different order/sequence. In particular, the additional object set 300f includes objects 302, 310, 314, 306. In this case, the user may reorder the additional object set 300f by swapping objects 302 and 310 and by swapping objects 314 and 306 to correctly order the objects 310, 302, 306, 314. If the user has successfully rearranged the additional object set 300f, and if this is the last object set, the user may click "SUBMIT" or a similar option to authenticate.

If the user makes an error, the method 200 may restart or the user may be denied access to the restricted resource. For example, the user may have a set number of attempts to complete authentication before the user is locked out of authentication or before another authentication technique is used. In the case of a restart, objects in a set are placed in a new random order and the sets could be presented to the user in a different order, including additional false object sets. This increases security by increasing the number of possible outcomes.

It should be appreciated that the sequential object sets and false object sets presented herein are merely some possible examples. Sequential object sets and false object sets may differ in the number of objects, type of objects, the order of objects, the number of false object sets, the number of sequential object sets, and the like.

It should also be appreciated that different levels of authentication are possible by using more or less sequential object sets, longer or shorter sequential object sets, or an increased inclusion of false object sets. For example, a lesser level of authentication may only require successfully rearranging one object set while a higher level of authentication may require multiple successfully rearranging of object sets and/or identification of a certain number of false object sets.

It should be understood that the processes depicted in FIG. 2 represent illustrations, and that other processes may be added or existing processes may be removed, modified, or rearranged without departing from the scope and spirit of the present disclosure.

Figure 4:
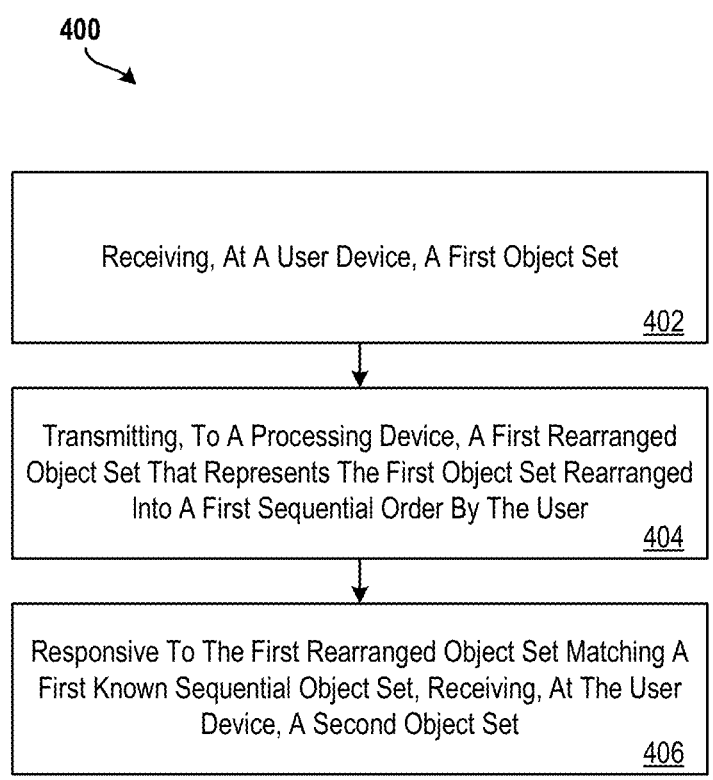
FIG. 4 illustrates a flow diagram of a method for using a sequential object set for authentication according to examples of the present disclosure.

FIG. 4 illustrates a flow diagram of a method 400 for using a sequential object set for authentication according to examples of the present disclosure. The method 400 may be performed, for example, by the processing system 20 of FIG. 5. The example method 400 is described below with reference to FIGS. 3A-3F but is not so limited.

At block 402, the method 400 includes receiving, at a user device, a first object set (e.g., the object set 302 of FIG. 3B). At block 404, the method 400 includes transmitting, to a processing device, a first rearranged object set (e.g., the first object set 300b of FIG. 3B) that represents the first object set rearranged into a first sequential order by the user. At block 406, the method 400 includes responsive to the first rearranged object set matching a first known sequential object set, receiving, at the user device, a second object set. In some examples, the second object set may be a false set (e.g., the false object set 300e of FIG. 3E) or another object set that needs to be rearranged (e.g., the second object set 300c of FIG. 3C).

In some examples, the method 400 includes transmitting, to the processing device, a second rearranged object set that represents the second object set rearranged into a second sequential order by the user. Responsive to the second rearranged object set matching a second known sequential object set, the method 400 further includes receiving, at the user device, access to a restricted resource.

In some examples, the method 400 includes transmitting, to the processing device, an indication that the second object set is a false object set. Responsive to identifying the second object set as a false object set, the method 400 further includes receiving, at the user device, access to a restricted resource.

In yet additional examples, the method 400 includes receiving, at the user device, a plurality of objects prior to receiving the first object set. The method 400 further includes transmitting, to the processing device, the first object set arranged into the first sequential order. In this case, the first object set is a subset of the plurality of objects.

In other examples, the method 400 includes transmitting, to the processing device, an indication that the second object set is a false object set, and, responsive to identifying the second object set as a false object set, the method 400 includes receiving, at the user device, a third object set. The method 400 then includes transmitting, to the processing device, a second rearranged object set that represents the third object set rearranged into a second sequential order by the user, and, responsive to the second rearranged object set matching a second known sequential object set, the method 400 includes receiving, at the user device, access to a restricted resource.

It should be understood that the processes depicted in FIG. 4 represent illustrations, and that other processes may be added or existing processes may be removed, modified, or rearranged without departing from the scope and spirit of the present disclosure.

Figure 5:
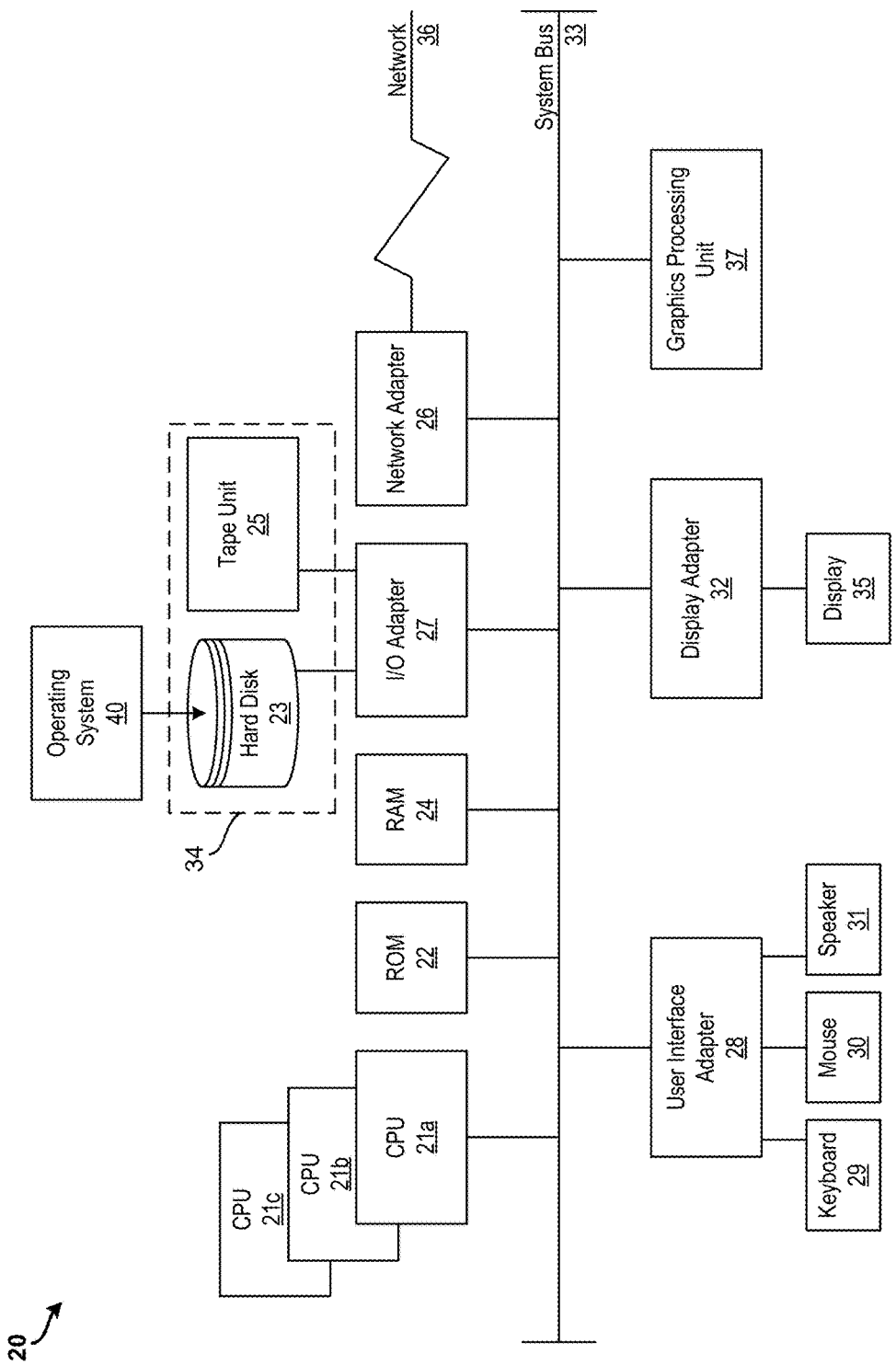
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
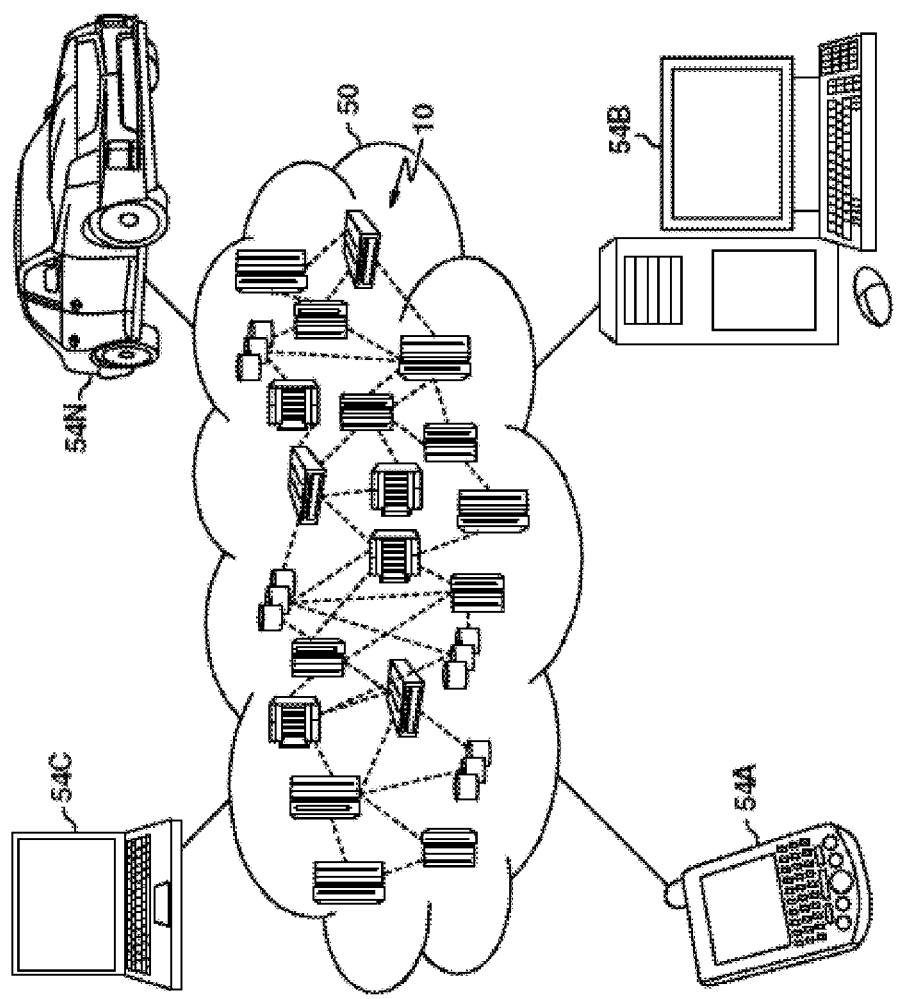
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
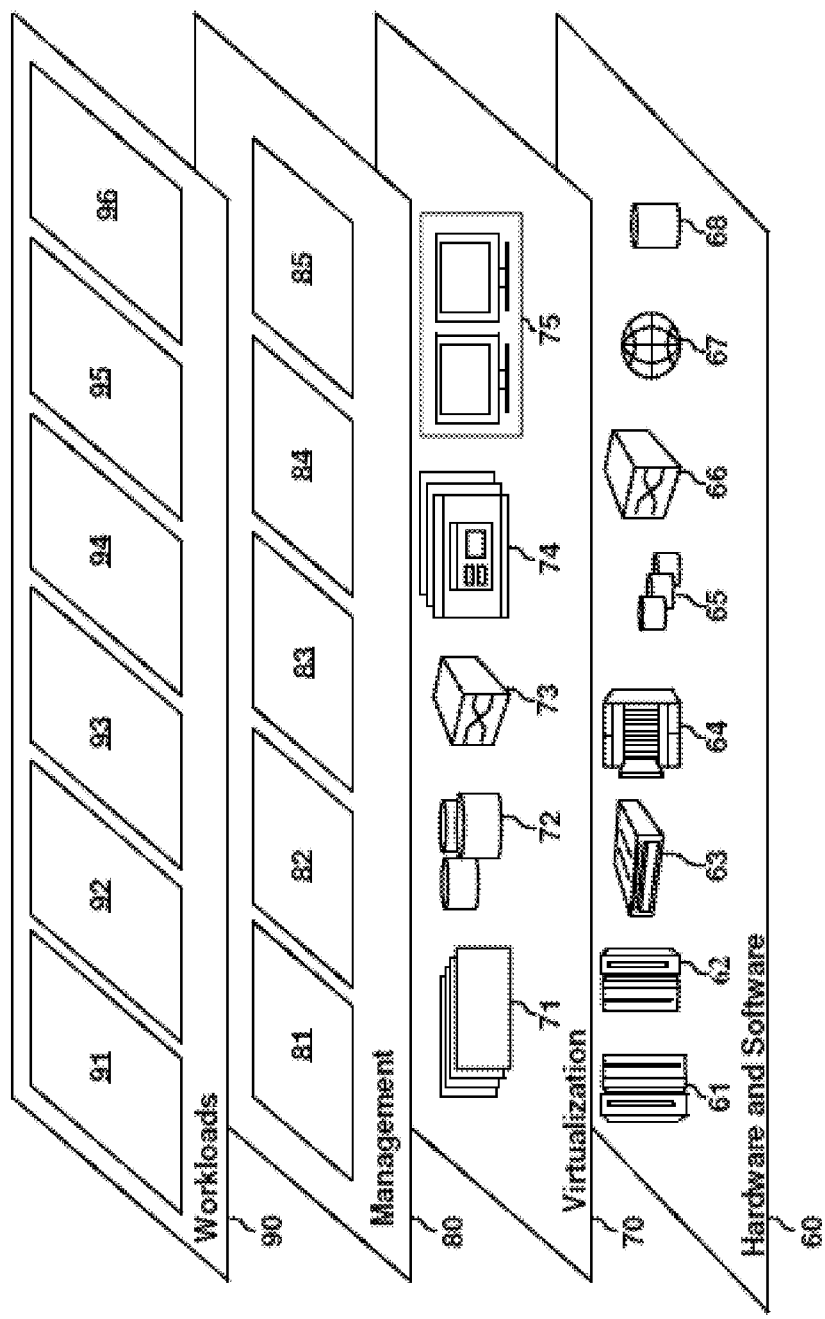
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sequential object set passwords 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for authentication, the method comprising:
    receiving, at a user device, a first object set;
    transmitting, to a processing device, a first rearranged object set that represents the first object set rearranged into a first sequential order by the user, the first sequential order being a different order than an order of the first object set;
    responsive to the first rearranged object set matching a first known sequential object set, receiving, at the user device, a second object set;
    transmitting, to the processing device, an indication that the second object set is a false object set;
    responsive to identifying the second object set as a false object set, receiving, at the user device, a third object set;
    transmitting, to the processing device, a second rearranged object set that represents the third object set rearranged into a second sequential order by the user, wherein the second sequential order being a different order than an order of the third object set; and
    responsive to the second rearranged object set matching a second known sequential object set, receiving, at the user device, access to a restricted resource.

2. A system for authentication, the system comprising:
    a memory comprising computer readable instructions; and
    a processing device for executing the computer readable instructions for performing a method, the method comprising:
        receiving, at a user device, a first object set;
        transmitting, to a processing device, a first rearranged object set that represents the first object set rearranged into a first sequential order by the user, the first sequential order being a different order than an order of the first object set;
        responsive to the first rearranged object set matching a first known sequential object set, receiving, at the user device, a second object set;
        transmitting, to the processing device, an indication that the second object set is a false object set;
        responsive to identifying the second object set as a false object set, receiving, at the user device, a third object set;
        transmitting, to the processing device, a second rearranged object set that represents the third object set rearranged into a second sequential order by the user, wherein the second sequential order being a different order than an order of the third object set; and
        responsive to the second rearranged object set matching a second known sequential object set, receiving, at the user device, access to a restricted resource.

3. A computer program product for authentication, the computer program product comprising:
    a computer readable storage medium having program instructions embodied therewith, wherein the computer readable storage medium is not a transitory signal per se, the program instructions executable by a processing device to cause the processing device to perform a method comprising:
        receiving, at a user device, a first object set;
        transmitting, to a processing device, a first rearranged object set that represents the first object set rearranged into a first sequential order by the user, the first sequential order being a different order than an order of the first object set;
        responsive to the first rearranged object set matching a first known sequential object set, receiving, at the user device, a second object set;
        transmitting, to the processing device, an indication that the second object set is a false object set;
        responsive to identifying the second object set as a false object set, receiving, at the user device, a third object set;
        transmitting, to the processing device, a second rearranged object set that represents the third object set rearranged into a second sequential order by the user, wherein the second sequential order being a different order than an order of the third object set; and responsive to the second rearranged object set matching a second known sequential object set, receiving, at the user device, access to a restricted resource.

* * * * *